United States Patent
Wang et al.

(10) Patent No.: US 10,070,411 B2
(45) Date of Patent: Sep. 4, 2018

(54) BATCH NOTIFICATION IN ONEM2M ENVIRONMENTS

(71) Applicant: Intel Corporation, Santa Clara, CA (US)

(72) Inventors: Guotong Wang, Beijing (CN); Anthony Lee, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 14/789,445

(22) Filed: Jul. 1, 2015

(65) Prior Publication Data

US 2016/0366663 A1    Dec. 15, 2016

Related U.S. Application Data

(60) Provisional application No. 62/175,575, filed on Jun. 15, 2015.

(51) Int. Cl.
*G06F 15/16* (2006.01)
*H04W 68/00* (2009.01)
*H04W 4/70* (2018.01)

(52) U.S. Cl.
CPC .......... *H04W 68/005* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 2003/0014558 A1* | 1/2003 | Amamiya | G06F 9/542 719/318 |
| 2005/0202390 A1* | 9/2005 | Allen | G09B 7/00 434/353 |
| 2015/0140958 A1* | 5/2015 | Turakhia | H04W 4/12 455/406 |
| 2015/0140973 A1* | 5/2015 | Turakhia | H04M 1/72519 455/414.1 |
| 2016/0088420 A1* | 3/2016 | Kim | H04L 67/025 370/328 |
| 2016/0292706 A1* | 10/2016 | Newnham | G06Q 30/0224 |
| 2017/0048646 A1* | 2/2017 | Foti | H04W 4/005 |

OTHER PUBLICATIONS

TS-0001-V1.6.1, Function Architecture, Jan. 30, 2015.
TS-0004-V1.0.1, Service Layer Core Protocol Specification, Jan. 30, 2015.
Office Action for Korean Patent Application No. 10-2015-0125802 (with English translation).

* cited by examiner

*Primary Examiner* — Brian Whipple
(74) *Attorney, Agent, or Firm* — Schiff Hardin LLP (57) ABSTRACT

In one embodiment, a method, comprising: configuring a batch notification based on setting a first value, the first value corresponding to a specified number of notifications to be stored before providing a batch notification; responsive to setting the first value, setting a second value, the second value corresponding to a duration commencing from generation of a first notification and ending at a specified temporal value; and automatically providing one or more notifications over a network compliant with a oneM2M specification based on the first and second values.

19 Claims, 4 Drawing Sheets

BATCH NOTIFICATION IN ONEM2M ENVIRONMENTS

CROSS REFERENCE TO RELATED APPLICATION

This application claims the benefit of U.S. Provisional Application No. 62/175,575 filed Jun. 15, 2015, which is hereby incorporated by reference in its entirety.

TECHNICAL FIELD

The present disclosure is generally related to machine-to-machine communications, and, more particularly, batch notifications in a oneM2M environment.

BACKGROUND

OneM2M is a set of specifications geared toward unifying the global M2M community by enabling the interoperability of M2M (machine-to-machine) systems across multiple networks and topologies. More particularly, the oneM2M specifications enable developers to build platforms that enable wide integration and cross system value regardless of existing sector or industry solutions. The set of specifications were introduced in January 2015, and are accessible to the public at http://www.onem2m.org/technical/published-documents, which are incorporated herein by reference in their entirety.

SUMMARY OF THE INVENTION

In one embodiment, a method, comprising: configuring a batch notification based on setting a first value, the first value corresponding to a specified number of notifications to be stored before providing a batch notification; responsive to setting the first value, setting a second value, the second value corresponding to a duration commencing from generation of a first notification and ending at a specified temporal value; and automatically providing one or more notifications over a network compliant with a oneM2M specification based on the first and second values.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of a batch notification method of the present disclosure can be better understood with reference to the following drawings. The components in the drawings are not necessarily to scale, emphasis instead being placed upon clearly illustrating the principles of a batch notification method. Moreover, in the drawings, like reference numerals designate corresponding parts throughout the several views.

DESCRIPTION OF EXAMPLE EMBODIMENTS

Certain embodiments of batch notification systems and methods are disclosed that modify the batch notify attribute (and corresponding operations) of oneM2M specifications, such as detailed in at least specifications TS-0004 and TS-0001, Table 9.6.8-2. For instance, the batch notify attribute comprises two values, duration and number of notifications to be batched. In one embodiment of a batch notification method, the duration is mandatory if the number of notifications to be batched is set.

Digressing briefly, the batch notify attribute indicates that a subscriber wants to receive batches of notifications rather than receiving them one at a time. The batch notify attribute expresses the notification policy of the subscriber and may include, according to the oneM2M specifications, one or two values: the number of notifications to be batched for delivery and a duration. When either value is set, the notification events are stored until either the specified number of notifications have been batched, or until a duration, which commences (starts) after the first notification was generated, has expired. Following these events, the batched notifications are sent. Also, if the batch notify attribute is used simultaneously with another attribute, LatestNotify, only the latest notification is sent, with an Event Category set to "latest." One shortcoming to the current set of oneM2M specifications is that both the number of notifications to be batched for delivery and the duration are optional. An example of a potential issue arising from the current oneM2M specifications is that some batched notifications may not be sent if only the number of notifications to be batched is set. For example, assume the number of notifications is set to five (5) without setting a duration. If the notifications reach four (4) and stop coming, then there is no way for the stored four (4) notifications to be sent. In contrast, by making the duration mandatory if the number of notifications to be batched is used, the batched notifications may be sent even if the number is not reached.

Having summarized various features of certain embodiments of a batch notification method of the present disclosure, reference will now be made in detail to the detailed description of a batch notification method as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of a batch notification method as defined by the appended claims. Further, it should be appreciated in the context of the present disclosure that the claims are not necessarily limited to the particular embodiments set out in the description.

Figure 1:
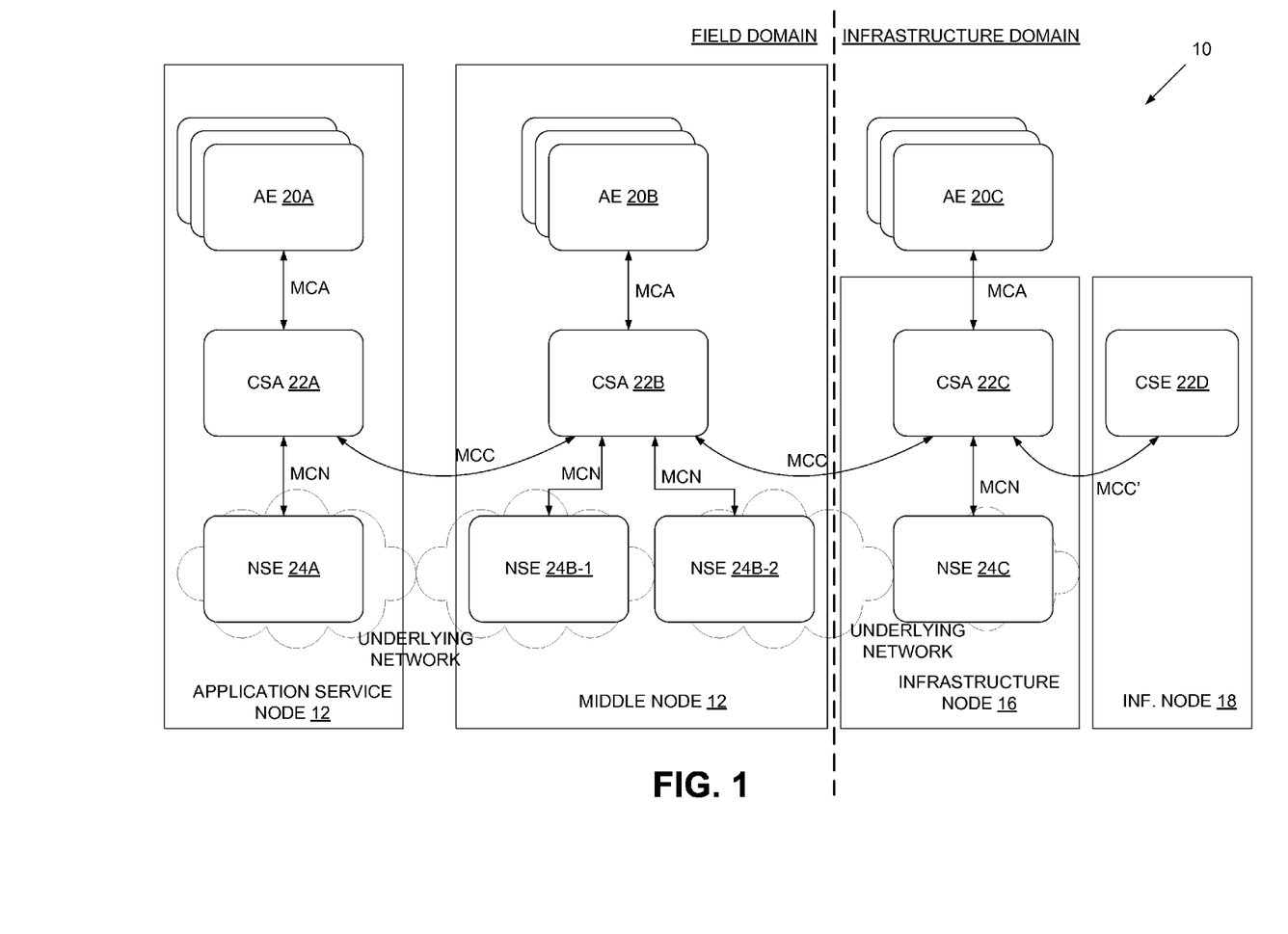
FIG. 1 is a schematic diagram that illustrates an example oneM2M environment in which an embodiment of a batch notification method may be used.

Referring now to FIG. 1, shown is a functional diagram that depicts an example oneM2M environment 10 in which an embodiment of a batch notification method may be used. It should be appreciated by one having ordinary skill in the art in the context of the present disclosure that the example oneM2M environment 10 comprises but one of many possible network configurations that are contemplated to be within the scope of the disclosure. In general, the oneM2M environment 10 is based on a multi-layered model that supports end-to-end services, the layers including an application layer, a common services layer, and a network services layer. In the depicted example, the oneM2M environment 10 comprises, in a field domain, an application service node 12 and a middle node 14, and in an infrastructure domain, infrastructure (Inf.) nodes 16 and 18. Note that a node in the oneM2M specifications refers to a logical, identifiable entity. Further, a field domain of any particular M2M (machine-to-machine) Service Provider can contain application service nodes, application dedicated nodes, middle nodes, Non-oneM2M nodes. An infrastructure domain of any particular M2M Service Provider contains exactly one infrastructure node. In the depicted oneM2M environment 10, the application service node 10 comprises an application entity (AE) 20A, a common services entity (CSE) 22A, and a network services entity (NSE) 24A. In general, an application service node 12 is a node that contains one common services entity 22A and at least one application entity 20A. There may be zero or more application service nodes 12 in a field domain of one M2M system. The middle node 14 comprises, in this example, an application entity (AE) 20B, a common services entity (CSE) 22B, and network services entities (NSEs) 24B-1, 24B-2. In general, a middle node 14 is a node that contains one common services entity 22B and zero or more application entities 20B. There may be zero or more middle nodes 14 in a field domain of one M2M system. The infrastructure node 16, which comprises an infrastructure domain for the services required in the depicted field domain, comprises an application entity (AE) 20C, a common services entity (CSE) 22C, and a network services entity (NSE) 24C. The infrastructure (Inf.) node 18, which comprises an infrastructure domain of another service provider (different than the service provider associated with the infrastructure node 16), comprises a common services entity (CSE) 22D. In general, the infrastructure node 16 (or 18) is a node that contains one common services entity 22C (22D) and zero or more application entities 20C. There is exactly one infrastructure node 16 per one M2M service provider. Note that other nodes may be used in some implementations as defined by the oneM2M specifications, including application dedicated nodes (containing at least one application entity and no common services entity) and non-oneM2M nodes (containing no application or common services entities, yet representing devices attached to the oneM2M system for interworking purposes, including management).

The application entities 20 (e.g., 20A-20C) provide application logic for end-to-end, machine-to-machine (M2M) services. Note that machine-to-machine services are those machines that do not require user intervention to provide services. For instance, a machine automatically makes a data call and sends data out. Each application entity 20 is uniquely identified with a respective AE-ID. Application entities 20 host the application(s) that require the notification(s), and may include, for instance, a fleet tracking application, a remote blood sugar monitoring application, or a power metering application, to name a few examples. The common services entities 22 (e.g., 22A-22D) provide a respective set of service functions that are common to M2M environments. Each common service entity 22 is uniquely identified with a respective CSE-ID. Some example service entity functions include data management, device management, M2M service subscription management, notification services, and location services, as is further explained in association with FIG. 2. The network services entities 24 (e.g., 24A, 24B-1, 24B-2, 24C) provide services to the common services entities 22 besides pure data transport. Some examples of services provided by the network services entities 24 include device management, location services, and device triggering.

The various entities 20, 22, and 24 communicate via one or more reference points or interfaces, denoted in FIG. 1 as Mc (mnemonic for M2M communications), which include reference points Mca (disposed between an application entity 20 and a common services entity 22, and enabling communication between the entities 20 and 22 and enabling the application entity 20 to use the services of the common services entity 22), Mcc (disposed between each of the common services entities 22, and enabling, for instance, the common services entity 22A to use the services supported by the common services entity 22B), Mcc' (disposed between common services entities 22 of different service providers), and Mcn (disposed between the common services entity 22 and the network services entity 24). The common services entities 22 access the network services functions provided by the underlying networks of the network services entities 24, such as 3GPP, 3GPP2 and WLAN, via the Mcn reference point. Within the same service provider domain, each common services entity 22 performs registration with the other common services entities 22 over the Mcc reference points to use the M2M services provided by each. Each of the application entities 20 performs registration with the respective common services entity 22 (e.g., AE 20A registers with CSE 22A via the reference point, Mca) to use the services provided by the common services entity 22. Registration involves verifying a request, authentication and authorization. Between different service providers, the infrastructure nodes 16 and 18 serve as gatekeepers to their respective service provider (SP) systems, enabling ingress and egress of information among different service providers. An M2M service provider supporting inter-M2M SP communications involves ensuring that the public domain names of the customer services entities 22 whose functionality is available across domains are held in its public Domain Name System (DNS) and pointing to the Internet Protocol (IP) address associated with the infrastructure node for the domain being the entry point (e.g., infrastructure node 16 the entry point for common services entity 22D) for accessibility purposes. The public domain names of the accessible customer services entities 22 comprise a sub-domain of the public domain name of the respective infrastructure node 16 (or 18), enabling the infrastructure node 16 (or 18) to include the needed DNS entry corresponding to the customer services entities 22 to whom access from other domains is allowed.

The exchange of information and/or access of resources occurs across the Mca and Mcc reference points (exposed by application programming interfaces or APIs operating under the principle of a RESTful architecture) according to a message flow that is based on a pair of primitives: request and response messages. As is known, a RESTful architecture comprises a software architecture style consisting of guidelines and best practices for creating scalable web services. RESTful architectures typically, yet not always, communicate over the hypertext transfer protocol (HTTP) with the same HTTP verbs used by web browsers to retrieve web pages and send data to remote services. The primitives are common service layer messages exchanged over the Mca, Mcc, and Mcc' reference points. Note that the Mcn reference points are defined by the underlying network, and one M2M specifications do not define primitives going over the underlying network. For instance, an application service node 24 translates a oneM2M primitive into the protocol abided by the underlying network to enable the sending of messages. When communication between an originator (of the request) and a receiver (receiver of the request and provider of a response) are collocated on the same M2M node in the common service layer, the primitives are exchanged directly. When communication between an originator and a remote receiver is via an underlying network (e.g., an IP-based underlying network), as indicated above, the primitives are mapped to the application layer communication protocols (e.g., HTTP, CoAP, MQTT, etc.) that use a transport layer protocol (e.g., TCP, UDP, etc.). Primitives, as described more fully in Clause 5.3.2 of TS-0004 of the oneM2M specifications, comprise a data structure consisting of a control part (containing parameters specifying the processes of the primitive) and an optional content part (representing resource data, either the complete or partial resource, such as values of one or more resource attributes).

The communications are initiated by either the application entities 20 or the common services entities 22. Each resource operation comprises the pair of primitives (request and response) carried over a specific reference point. Requests (e.g., from an originator to a receiver) contain mandatory and optional and conditional parameters. For instance, as set forth in Clause 8.1.2 of TS-0001 of the oneM2M specifications, a mandatory parameter includes (a) the "To" parameter which comprises the address of a target resource (i.e., the resource which is addressed for a specific operation) or target attribute for an operation, known either via pre-provisioning (see, e.g., clause 11.2) or discover (see, e.g., clause 10.2.6), the (b) "from" parameter, which identifies the originator of the request (and used by a receiver to check the Originator identity for access privilege verification), and (c) the "operation" parameter, which indicates the operation to be executed at a receiver. Operation parameters include create, retrieve, update, delete, and notify. Conditional parameters include content (the resource content to be transferred), and resource type. Optional parameters include the name of the resource, originating time stamp (e.g., when a message is built), request and result expiration timestamps, response type, result content (e.g., attributes, hierarchical address, etc.), among others. The response received by the originator of a request accessing resources over Mca and Mcc reference points likewise contain mandatory and optional parameters. For instance, mandatory parameters include (a) a response code, which indicates whether a requested operation is successful (e.g., indicates to the originator that the requested operation has been executed successfully by a hosting common services entity 22), unsuccessful, or is an acknowledgement, and (b) a request identifier, which should match the request identifier that prompted the response. Conditional parameters include the resource content, identifier of the originator, identifier of the receiver, origination and result expiration timestamps, among others.

The originator of a request may comprise an application entity 20 or a common services entity 22, and may involve no hops (e.g., the common services entity 22A requesting a resource directly from the common services entity 22B, the latter serving as a hosting common services entity) or multiple hops (the common services entity 22A requesting a resource from the host common services entity 22C via the intermediate or transit common services entity 22B forwarding the request). In each case, the hosting common services entity 22 provides a response after verifying access rights.

For communications between the common services entities 22 and the network services entities 24 across the Mcn reference point, the communications include messaging services, network APIs defined by other standards developing organizations, and interworking for services and security aspects for machine type communications as defined by, for instance, 3GFPP (3$^{rd}$ Generation Partnership Project) and 3GPP2.

Resources are the representations in the common services entity 22 of the components and elements within a oneM2M system. Other common services entities 22, application entities 20, application data representing sensors, commands, etc. are known to the common services entity 22 by their resource representation. In general, a resource is a uniquely addressable entity in the oneM2M environment 10. A resource is transferred and manipulated using oneM2M operations (e.g., create, retrieve, update, delete), and may contain a child resource(s) and attribute(s). A child resource is a sub-source of another resource that is its parent resource, and an attribute stores information pertaining to the resource itself. There exists many types of resources in a oneM2M environment 10 that are specified in association with a common services entity 22. The types of resources in a oneM2M environment 10 may be found in Table 9.6.1.1-1 in TS-0001 of the M2M specifications, and include a container resource, application entity resource, and a subscription resource, among others. The container resource shares data instances among entities, and is used as a mediator that buffers data exchanged between application entities 20 and/or common services entities 22. The exchange of data between application entities 20 (e.g., an application entity 20 on a node in a field domain and the peer application entity on the infrastructure domain) is abstracted from the need to set up direct connections and allows for scenarios where both entities in the exchange do not have the same reachability schedule. Child resource types for the container resource include subscription. The application entity resource stores information about the application entity, and is created as a result of successful registration of an application entity 20 with a registrar common services entity 22 (the common services entity that the application entity registers with). Child resource types for the container include subscription. The subscription resource represents the subscription information related to a resource, where such a resource may be a child resource for the subscribed-to resource. For instance, the container resource has a subscription resource as a child resource, as indicated above. The subscription resource represents a subscription to a subscribed-to resource. An originator may create a resource type of subscription when the originator has a retrieve privilege to the subscribed-to resource.

The API defines how to address and manipulate resources, wherein the resources are identified by a uniform resource identifier (URI). An address of a resource comprises a string of characters that uniquely identify the targeted resource within the scope of a request for access, wherein the scope may be relative to common services entities 22 (CSE-relative—the request targeting a resource that resides on the same common services entity 22 as the receiver common services entity 22), relative to a service provider (SP-relative—the request is targeting a resource that resides on a common services entity 22 within the same M2M SP domain as the originator of the request), or absolute (where the request is targeting a resource that resides on a common services entity 22 that is within an MSM SP domain that is different from the MSM SP domain of the originator of the request).

One goal of MSM addressing is to reach the common services entity 22 with which the target application entity 20 is registered, and ultimately, the target application entity 20 on the oneM2M node on which the target application entity resides. The reachability/routing from and to application entities 20 on oneM2M nodes is associated with the common services entities 22 with which these application entities 20 are registered and the connectivity of such common services entities 22 to the underlying networks. Thus, reaching an application entity 20 is achieved through reaching the common services entity 22 that the application entity 20 is registered with. A common services entity (CSE) point of Access (PoA) provides information needed to reach a common services entity from an underlying network perspective. The CSE-PoA contains information that is resolved into a network address. Once communication with a common services entity 22 is achieved, an application entity 20 registered with that common services entity 22 may be reached as long as the application entity 20 is uniquely identified (e.g., using the AE-ID). The information included in the CSE-PoA depends on the characteristics of the underlying network and a oneM2M node transport capability. The CSE-PoA contains the information (provided at registration) used by the oneM2M system to locate routing information for a common services entity 22. In general, the addressing and routing information that is related to a common services entity 22 is achieved when a static public address is assigned to a oneM2M node and direct DNS address translation or dynamic DNS address translation is used. In these circumstances, the CSE-PoA for a registered common services entity comprises a URI conforming to IETF RFC 3986. If the CSE-PoA is related to common services entities 22 associated with a fixed network, the CSA-PoA for a registered common services entity 22 comprises a URI as described above. For private addresses, the public address upon which the private address is built is mapped to the private address. If the CSE-PoA is related to common services entities 22 associated with mobile networks, the CSE-PoA for the registered common services entity 22 includes appropriate information required by the respective underlying network and supported by oneM2M. For instance, each underlying network should specify the mechanism for allowing a oneM2M SP to fetch an IP address associated with the common services entity attaching to that network and hence the information to be included in the CSE-PoA for the registered common services entity 22. If the oneM2M SP has connections to multiple underlying networks, a binding between the registered common services entity 22 and the associated underlying network is established through common services entities 22 identifying the underlying network at registration/update time. If not reachable by a previously known IP address yet supporting of short message service (SMS), the originating common services entity 22 may use SMS for device triggering to wake up the oneM2M node to renew the IP addresses. Note that additional information pertaining to requests and responses, as well as resources may be found in the oneM2M specifications TS-0001 and TS-0004 at http://www.onem2 m.org/technical/published-documents, the TS-0001 and TS-0004 specifications incorporated herein by reference in their entirety.

Figure 2:
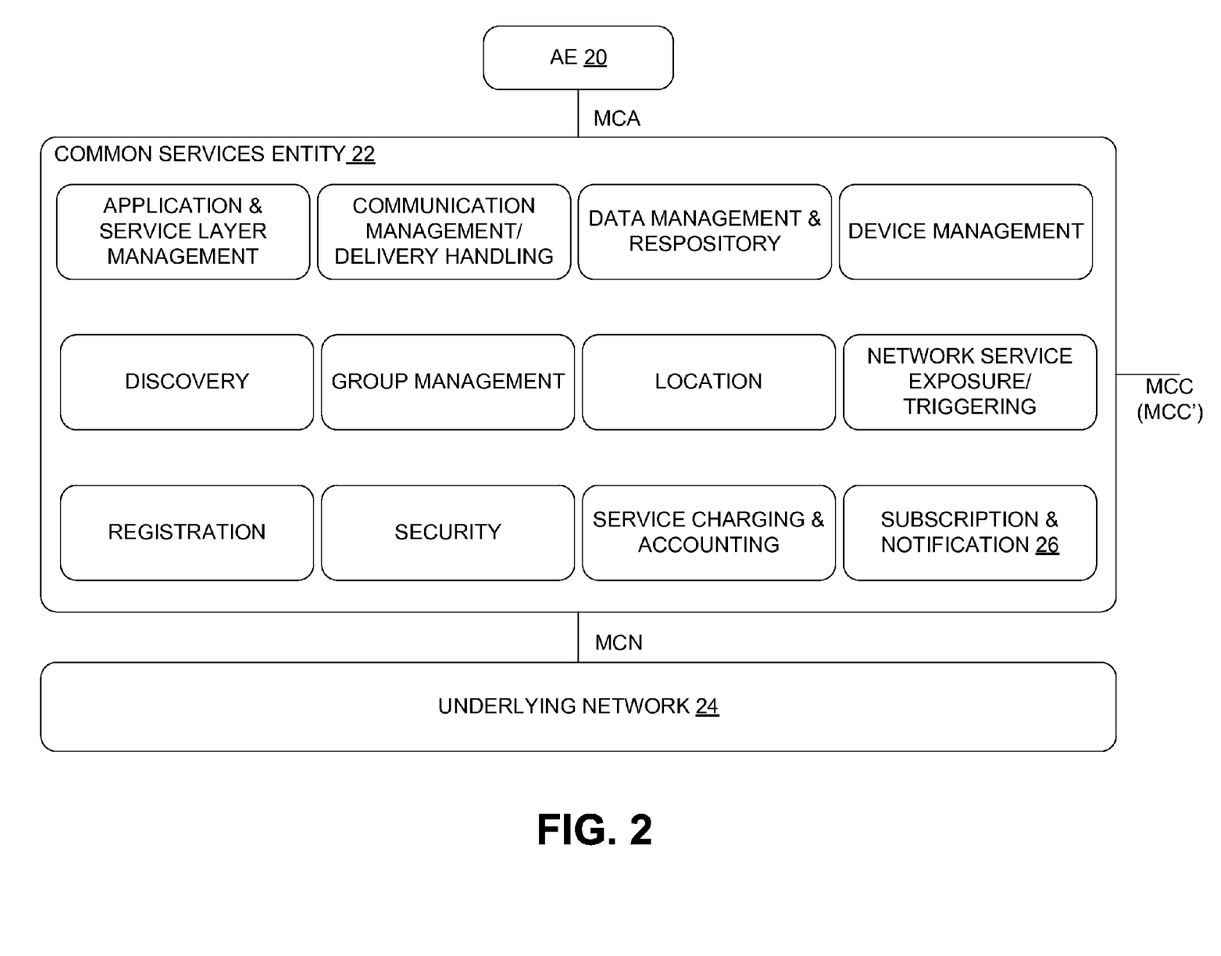
FIG. 2 is a schematic diagram that illustrates an example common services entity architecture in which an embodiment of a batch notification method may be used.

Having generally described operations for the oneM2M environment 10, attention is directed to FIG. 2 showing an example common services entity 22, and in particular, some example functions performed by the common services entity 22. It should be appreciated by one having ordinary skill in the art that the functions illustrated in FIG. 2 are used as an example, and that fewer, additional, and/or other functions may be performed by the common services entity 22 in some embodiments. The common services entity 22 is coupled to the application entity 20 via reference point Mca, and to the network services entity 24 via reference point Mcn. Also shown is reference point Mcc (and/or in some embodiments, Mcc'), which couples to another common services entity 22. The common services entity 22 comprises a plurality of functional modules, including those for application and service layer management, communication management/delivery handling, data management and repository, device management, discovery, group management, location, network service exposure/triggering, registration, security, service charging and accounting, and significantly, subscription and notification 26. The subscription and notification module 26 provides notifications to a subscription that tracks event changes on a resource (e.g., deletion of a resource). A subscription to a resource is initiated by an application entity 20 or a common services entity 22, and is granted by a host common services entity 22 based on the results of access control policies. In an active resource subscription, the host common services entity 22 sends a notification (e.g., an operation on a resource, such as a response message with the operation parameter set to notify (N)) regarding a notification event to the address(es) where the resource subscriber wants to receive it. Application entities 20 and common services entities 22 subscribe to resources of other common services entities 22. A subscription hosting common services entity 22 sends notifications to the address(es) specified by the resource subscriber when or in response to modifications to a resource are made. Each subscription may include notification policies that specify which, when, and how notifications are sent. A subscription is represented as a resource subscription, and the function includes the inclusion of a resource subscriber ID, the hosting common services entity ID and subscribed-to resource address(es) per resource subscription request. Also optionally included are other criteria, such as resource modifications of interest and notification policy, and the address(es) where the notifications are sent. The notification functions of the subscription and notification module 26 also include the ability to subscribe to a single resource via a single subscription or to subscribe to multiple resources via a single subscription when grouped and represented as a single group resource.

As explained above, each subscription may include a notification policy that specifies which, when, and how notifications are sent. One of the attributes of the subscription resource is revealed in Table 9.6.8-2 of the TS-0001 specification, and conventionally has the following attribute or notification policy: "This attribute (notification policy) indicates that the subscriber wants to receive batches of notifications rather than receiving them one at a time. This attribute expresses the subscriber's notification policy and may include two values: the number of notifications to be batched for delivery and a duration. When either value is set, notification events are temporarily stored until either the specified number of notifications have been batched, or until a duration which starts after the first notification was generated has expired. Following which the batched notifications are sent. If batchnotify is used simultaneously with latestNotify, only the latest notification shall be sent and have the event Category set to 'latest'." In an embodiment of a batch notification method as described herein, the aforementioned notification policy is modified to include the requirement that the value of duration shall be set if the number of notifications is used. In other words, the duration is now mandatory if the number of notifications to be batched is used.

Figure 3:
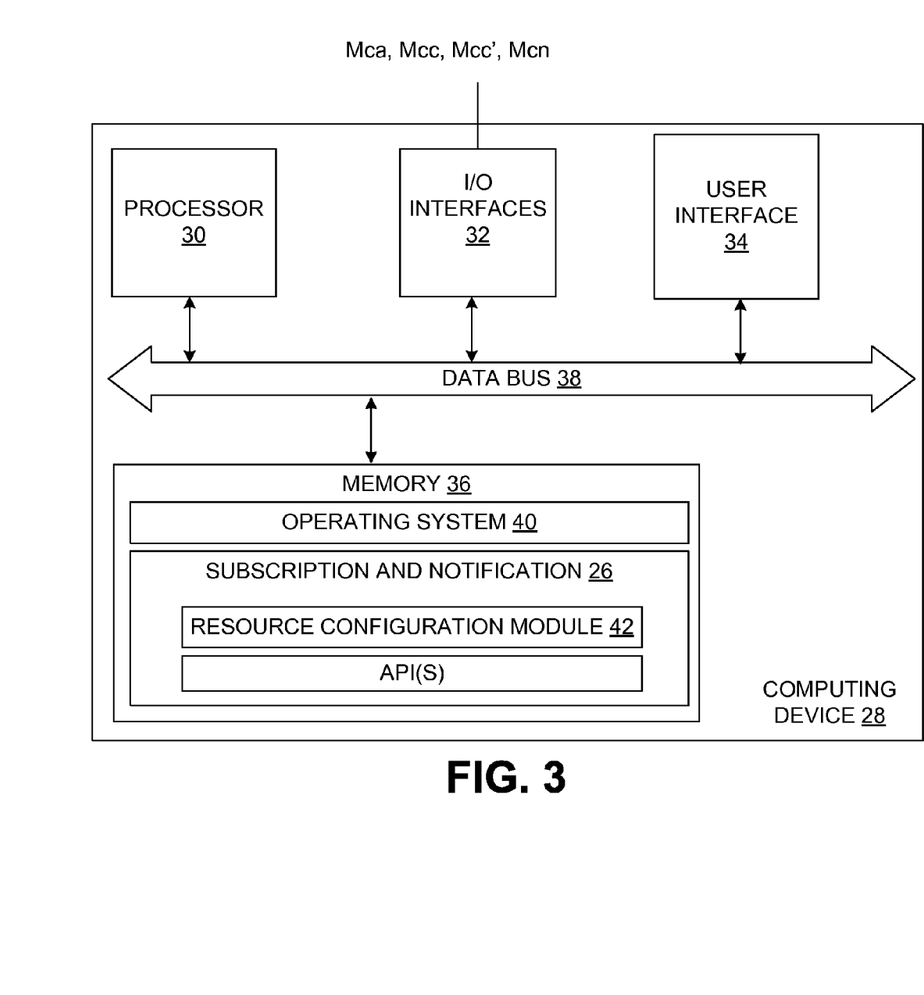
FIG. 3 is a block diagram that illustrates an embodiment of an example device that provides a batch notification based on an embodiment of a batch notification method.

The configuration of the batch notify attribute may be done manually or automatically as preprogrammed at a computing device. It should be appreciated by one having ordinary skill in the art, in the context of the present disclosure, that in general, the configuration of the batch notify attribute may be implemented by an application or the user of the application, and that the oneM2M specifications do not mandate a particular mechanism as to how to configure the batch notify attribute (i.e., is outside of the scope of the oneM2M specifications). Referring to FIG. 3, shown is an example computing device 28 that may be used for configuration and setting of values of the batch notifications, as well as subscription and notification services based on the functionality described above for module 26. The computing device 28 may be embodied as the common services entity 22, among other devices. One having ordinary skill in the art should appreciate in the context of the present disclosure that the example computing device 28 is merely illustrative, and that some embodiments of computing devices may comprise fewer or additional components, and/or some of the functionality associated with the various components depicted in FIG. 3 may be combined, or further distributed among additional modules or controllers, in some embodiments. Referring to FIG. 3, with continued reference to FIGS. 1-2, the computing device 28 is depicted in this example as a computer system that is used for the configuration of resources, but may be embodied as a field programmable gate array (FPGA), application specific integrated circuit (ASIC), among other devices. It should be appreciated that certain well-known components of computer systems are omitted here to avoid obfuscating relevant features of the computing device 28. In one embodiment, the computing device 28 comprises one or more processors, such as processor 30, input/output (I/O) interface(s) 32, user interface 34, and memory 36, all coupled to one or more data busses, such as data bus 38. The memory 36 may include any one or a combination of volatile memory elements (e.g., random-access memory RAM, such as DRAM, and SRAM, etc.) and nonvolatile memory elements (e.g., ROM, hard drive, tape, CDROM, etc.). The memory 36 may store a native operating system, one or more native applications, emulation systems, or emulated applications for any of a variety of operating systems and/or emulated hardware platforms, emulated operating systems, etc.

In the example embodiment depicted in FIG. 3, the memory 36 comprises an operating system 40 and the subscription and notification module 26, which includes a resource configuration module 42 and in one embodiment, one or more APIs to expose the services of the computing device 28 for communication across the reference points. It should be appreciated that in some embodiments, additional or fewer software modules (e.g., combined functionality) may be deployed in the memory 36 or additional memory. In some embodiments, a separate storage device, such as a persistent memory (e.g., optical, magnetic, and/or semiconductor memory and associated drives), may be coupled to the data bus 38 or coupled to another network and in communication with the data bus 38 via the I/O interfaces 32. The storage device may be a removable device, such as a memory stick or disc.

In one embodiment, the resource configuration module 42 comprises software/firmware that is executed by the processor 30 according to the type definition specified in oneM2M specification, TS-0004, Table 6.3.4.5-1, reproduced in part below:

TABLE 6.3.4.5-1

| Element Path | Element Data Type | Multiplicity | Note |
|---|---|---|---|
| Number | xs:nonNegativeInteger | 0 . . . 1 | |
| Duration | xs:duration | 0 . . . 1 | It shall be present if the element of number is present |

The above type definition is used for the attribute, batchNotify in the subscription resource. Built-in data types, such as nonNegativeInteger and duration are incorporated from an XML Schema definition based on W3C XMLSchemaP2, "W3C Recommendation (2004), XML Schema Part 2: Datatypes Second Edition," with a name space identifier for http://www.w3.org/2001/XMLSchema referred to by using the prefix "xs." In some embodiments, the common services layer may be implemented based on JSON (JavaScript Object Notation) content serialization. The duration is a data type that represents durations of time, and the nonNegativeInteger has a lexical representation consisting of an optional sign followed by a non-empty finite-length sequence of decimal digits (#x30-#x39). If the sign is omitted, the positive sign ('+') is assumed. If the sign is present, it shall be "+" except for lexical forms denoting zero, which may be preceded by a positive ('+) or a negative ('−') sign. For example, 1, 0, 12678967543233, +100000. The value of 0 . . . 1 indicates that the child resource/attribute is optional. If present, it can have an instance of one only. Note the mandatory provision in the notes for duration. The primitive request parameters are provided by Table 7.1.1.1-1, under Clause 7.1 of TS-0004, and the primitive response parameters are depicted in Table 7.1.1.2-1 under Clause 7.1 of in TS-0004, Section 7.1 incorporated by reference in its entirety.

In one embodiment, the resource configuration module 42 may receive information over the oneM2M environment 10 via the I/O interfaces 32 (e.g., from an application entity 20, common services entity 22, etc.), the information corresponding to a certain condition (e.g., temperature of a device, frequency of exceeding certain limits, or other sensed parameters), and based on that condition(s), configure and implement the batch notify process automatically. In some embodiments, an administrator may configure the batch notify via interaction with the user interface 34.

Execution of the subscription and notification module 26 and the resource configuration module 42 may be implemented by the processor 30 under the management and/or control of the operating system 40. As noted previously, the subscription and notification module 26 may include an API to expose the services of the computing device 28 for communication across the reference points, though in some embodiments, the APIs may be provided via other devices or components. The processor 30 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing device 28.

The I/O interfaces 32 provide one or more interfaces (e.g., Mca, Mcc, Mcc', Mcn) to one or more systems or devices, and may include one or more of the reference points described above. The user interface 34 may comprise a screen display device and corresponding mouse and/or keyboard that are collectively or individually integral to the computing device 28 or function as peripherals to the computing device 28, and in some embodiments, may include other components such as microphones, etc.

When certain embodiments of the computing device 28 are implemented at least in part with software (including firmware), as depicted in FIG. 3, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the computing device 28 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
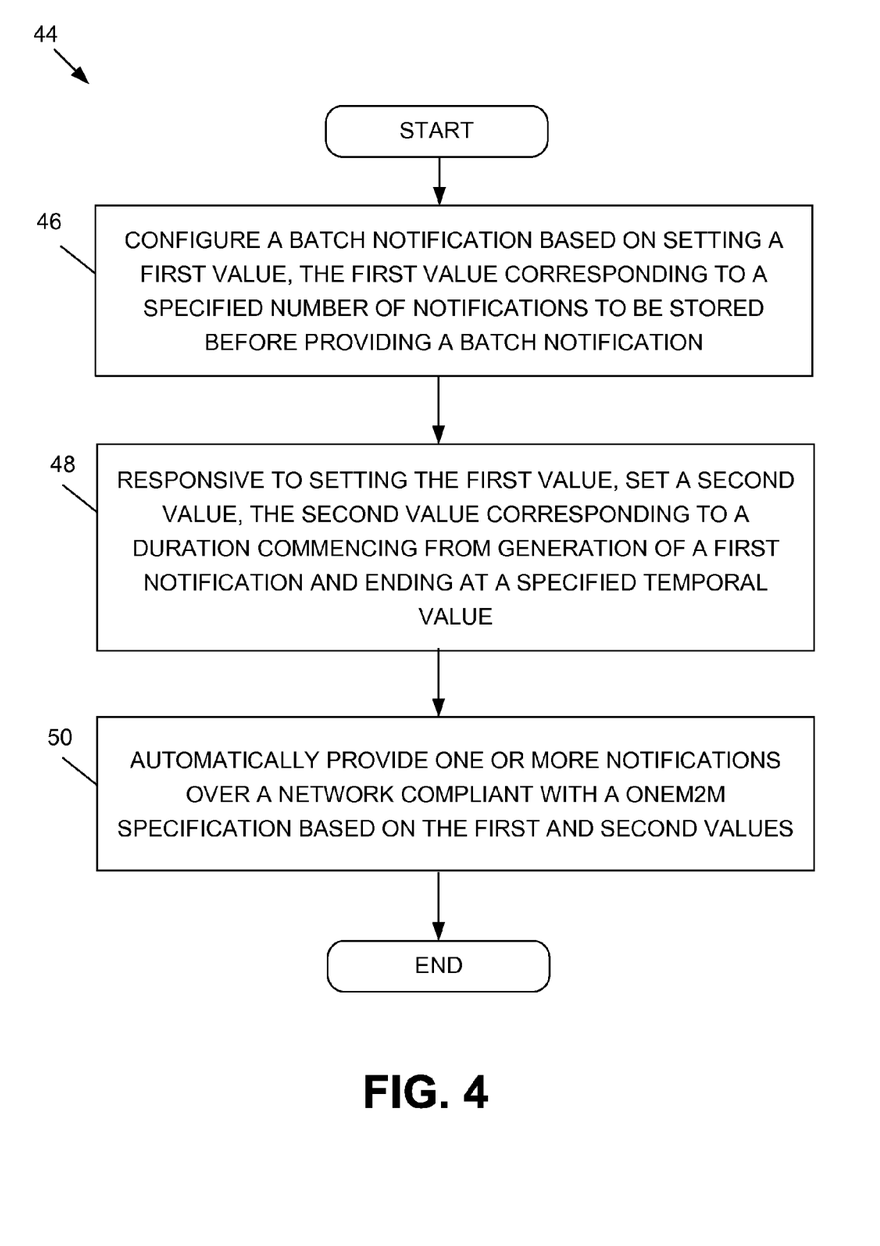
FIG. 4 is a flow diagram that illustrates an embodiment of batch notification method.

Having described some example embodiments of a batch notification system and method, it should be appreciated in view of the present disclosure that one embodiment of a batch notification method, the method depicted in FIG. 4 and denoted as method 44, comprises configuring a batch notification based on setting a first value, the first value corresponding to a specified number of notifications to be stored before providing a batch notification (46); responsive to setting the first value, setting a second value, the second value corresponding to a duration commencing from generation of a first notification and ending at a specified temporal value (48); and automatically providing one or more notifications over a network compliant with a oneM2M specification based on the first and second values (50).

Any process descriptions or blocks in flow charts should be understood as representing steps or logical functions in the process, and alternate implementations are included within the scope of the embodiments in which functions may be executed out of order from that shown or discussed, including substantially concurrently, depending on the functionality involved, as would be understood by those reasonably skilled in the art of the present disclosure.

It should be emphasized that the above-described embodiments of the batch notification method are merely possible examples of implementations, merely set forth for a clear understanding of the principles of the batch notification method. Many variations and modifications may be made to the above-described embodiment(s) of the batch notification method without departing substantially from the spirit and principles of the disclosure. All such modifications and variations are intended to be included herein within the scope of the batch notification method and protected by the following claims.

At least the following is claimed:

1. A method, comprising:
    configuring, by a processor, a batch notification based on setting a first value, the first value corresponding to a specified number of notifications to be stored before providing a batch notification;
    setting, by the processor, a second value based on the first value, the second value corresponding to a duration commencing from generation of a first notification and ending at a specified temporal value; and
    automatically providing, by the processor, one or more notifications over a network compliant with a oneM2M specification based on the first and second values.

2. The method of claim 1, wherein the configuring involves user intervention with a computing device comprising the processor.

3. The method of claim 1, wherein the setting of the second value occurs automatically.

4. The method of claim 1, wherein the configuring is implemented at a common services entity that is coupled to one or a combination of an application entity, a network services entity, or one or more other common services entities.

5. The method of claim 4, wherein the network services entity comprises an underlying Internet Protocol (IP) network accessed via application and transport layers.

6. The method of claim 1, wherein the configuring is based on an XML schema.

7. The method of claim 1, wherein the network comprises an M2M application layer, an M2M service layer, and an underlying network services layer.

8. The method of claim 1, wherein providing the notifications includes providing over a single service provider domain.

9. The method of claim 1, wherein providing the notifications includes providing over multiple service provider domains.

10. A system, comprising:
    a memory encoded with software; and
    a processor configured by the software to:
        set a first value for a batch notification, the first value corresponding to a specified number of notifications to be stored before providing a batch notification;
        set a second value based on the first value, the second value corresponding to a duration commencing from generation of a first notification and ending at a specified temporal value; and
        automatically provide the batch notification over a network compliant with a oneM2M specification based on the first and second values.

11. The system of claim 10, further comprising a user interface coupled to the processor, wherein the processor is further configured by the software to receive user input corresponding to the setting of the first value and responsively set the second value.

12. The system of claim 10, wherein the processor is configured by the software to automatically set the second value.

13. The system of claim 10, wherein the processor and the software are implemented at a common services entity that is coupled to one or a combination of an application entity, a network services entity, or one or more other common services entities.

14. The system of claim 13, wherein the network services entity comprises an underlying Internet Protocol (IP) network accessed via application and transport layers.

15. The system of claim 10, the processor is configured by the software to set the first and second values according to one of an XML schema or JSON.

16. The system of claim 10, wherein the network comprises an M2M application layer, an M2M service layer, and an underlying network services layer.

17. The system of claim 10, wherein the processor is configured by the software to provide the batch notification over a single service provider domain.

18. The system of claim 10, wherein the processor is configured by the software to provide the batch notification over multiple service provider domains.

19. A method comprising:
- setting, by a processor, a first value for a batch notification, the first value corresponding to a specified number of notifications to be stored before providing a batch notification over a network compliant with a oneM2M specification;
- automatically setting, by the processor, a second value based on the first value, the second value corresponding to a duration commencing from generation of a first notification and ending at a specified temporal value; and
- automatically providing, by the processor, the batch notification over the network based on the first and second values.

* * * * *